(12) United States Patent
Caber

(10) Patent No.: US 8,885,044 B2
(45) Date of Patent: Nov. 11, 2014

(54) METHODS AND APPARATUS FOR DETECTING A TARGET

(75) Inventor: Timothy E. Caber, Tucson, AZ (US)

(73) Assignee: Raytheon Comopany, Waltham, MA (US)

( * ) Notice: Subject to any disclaimer, the term of this patent is extended or adjusted under 35 U.S.C. 154(b) by 1702 days.

(21) Appl. No.: 11/939,960

(22) Filed: Nov. 14, 2007

(65) Prior Publication Data

US 2010/0283852 A1 Nov. 11, 2010

(51) Int. Cl.
*H04N 7/18* (2006.01)
*F41G 7/22* (2006.01)
*G01S 3/784* (2006.01)
*F41G 7/00* (2006.01)

(52) U.S. Cl.
CPC .............. *F41G 7/007* (2013.01); *F41G 7/2286* (2013.01); *F41G 7/2293* (2013.01); *G01S 3/784* (2013.01); *F41G 7/2253* (2013.01); *F41G 7/2206* (2013.01)
USPC ........................................................ 348/144

(58) Field of Classification Search
USPC .......................................... 348/144, 145, 169
See application file for complete search history.

(56) References Cited

U.S. PATENT DOCUMENTS

| 4,256,275 | A | * | 3/1981 | Flick et al. ................... 244/3.19 |
| 2002/0041328 | A1 | * | 4/2002 | LeCompte et al. ........... 348/144 |
| 2004/0073360 | A1 | * | 4/2004 | Foxlin ............................ 701/207 |
| 2008/0169384 | A1 | * | 7/2008 | Adams et al. ................ 244/76 R |
| 2009/0015674 | A1 | * | 1/2009 | Alley et al. .................... 348/144 |

* cited by examiner

*Primary Examiner* — Wing F Chan
*Assistant Examiner* — Andrew Woo
(74) *Attorney, Agent, or Firm* — Burns & Levinson LLP; Joseph M. Maraia

(57) ABSTRACT

An exemplary apparatus providing an improved detection system is disclosed as having: a sensor array adapted to detect radiation emanating from a potential target and a missile guidance system for controlling a missile's trajectory. Disclosed features and specifications may be variously controlled, adapted or otherwise optionally modified to improve and/or modify the performance characteristics of the detection system. Exemplary embodiments of the present invention generally provide a detection system for use as, for example, a target detection system for a missile guidance system.

15 Claims, 12 Drawing Sheets

METHODS AND APPARATUS FOR DETECTING A TARGET

FIELD OF INVENTION

The present invention provides improved systems and methods for enhanced detection of signals; and more particularly, representative and exemplary embodiments of the present invention generally relate to systems for detecting targets for missiles. In one representative aspect, various exemplary embodiments of the present invention relate to a detection system having a scanned sensor array.

BACKGROUND OF INVENTION

In general, it is preferable that when firing a guided projectile such as a missile, that the acquisition of the target occur as quickly and from as far away as possible. A missile system that acquires a target earlier does not require precise initial targeting or a launch platform in close proximity to the target. For military applications, these characteristics are especially important.

In order to detect the presence of a target, a missile system must be equipped with a sensor system. These sensor systems may detect radiation emanating from a target, determine the point of origin of that radiation, and direct the missile accordingly. The sensors can be sensitive to many different types of radiation emanating from a target including infra-red, visible light, radar, etc.

In many cases, the process of firing a missile includes a separate detection system that can detect the presence of possible targets. This auxiliary system may be a ground or vehicle-based radar station that is located in close proximity to the missile silo or magazine. The auxiliary detection system, upon detecting the possible presence of a target, maps out an uncertainty volume. This uncertainty volume describes a space—generally in the form of a cone emanating from the auxiliary detection system—in which the auxiliary detection system detects the presence of a possible target. The dimensions and orientation of the uncertainty volume are then transferred to the missile which, when fired, may scan the uncertainty volume for possible targets to attack. Depending upon the targeting requirements of the missile, the dimensions of the uncertainty volume can either be narrowed to increase the probability that the missile will find a target or broadened to ensure that a thorough search for targets is performed. If the missile itself does not efficiently detect targets, the initial uncertainty volume may be narrowed. However, if the uncertainty volume is too narrow it may not contain any targets. A broader uncertainty volume may be more preferable, but requires that the missile more efficiently and accurately search that uncertainty volume for a target.

One way to make a missile targeting system scan an uncertainty volume more efficiently is to increase the accuracy of its detection systems. Several methods have been used to increase the accuracy of missile detection systems. These include step-staring or tiling a square array of sensor detectors. This method includes recording data from the sensor system, moving the entire sensor system to record another image that does not overlap with the first, and then tiling the results to generate a larger data set. This method relies on the accuracy of each sensor pixel in the sensor array, potentially resulting in inaccurate data.

The sensor systems that missiles carry are not perfect and often contain defects such as dead, always-on, noisy or inaccurate sensor pixels. These inaccuracies result in a missile that is less likely to detect a probable target and more likely to detect a false target. They also severely limit the effectiveness of the step-staring or tiling method mentioned above. Several methods have been used in an effort to increase the fidelity of a missile's sensor systems. These include summing or averaging multiple frames recorded from the sensor system in an attempt to remove noise recorded by the sensor system. Although these methods are able to remove some noise from the system, they do not account for the problems associated with dead, always-on or inaccurate sensor pixels.

SUMMARY OF THE INVENTION

In various representative aspects, the present invention provides a system for detecting a target. Exemplary features generally include a sensor array having a plurality of sensor pixels, a computing device coupled to the sensory array, and a translating device that is coupled to the sensor array and configured to scan the field of vision of the sensor array across a scene at an approximately known rate.

Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly disclosed herein.

BRIEF DESCRIPTION OF THE DRAWINGS

Representative elements, operational features, applications and/or advantages of the present invention reside in the details of construction and operation as more fully hereafter depicted, described and claimed—reference being made to the accompanying drawings forming a part hereof, wherein like numerals refer to like parts throughout. Other elements, operational features, applications and/or advantages may become apparent in light of certain exemplary embodiments recited in the Detailed Description, wherein:

Elements in the Figures are illustrated for simplicity and clarity and have not necessarily been drawn to scale. For example, the dimensions of some of the elements in the Figures may be exaggerated relative to other elements to help improve understanding of various embodiments of the present invention.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

The terms "first", "second", and the like herein, if any, are generally used for distinguishing between similar elements and not necessarily for describing a sequential or chronological order. Moreover, the terms "front", "back", "top", "bottom", "over", "under", and the like, if any, are generally employed for descriptive purposes and not necessarily for comprehensively describing exclusive relative position or order. Any of the preceding terms so used may be interchanged under appropriate circumstances such that various embodiments of the invention described herein, for example, are capable of operation in orientations and environments other than those explicitly illustrated or otherwise described.

In accordance with an exemplary embodiment, the present invention provides an improved detection system 100. In the present embodiment, the improved detection system 100 comprises an improved targeting system for missiles. In alternative embodiments, the improved detection system 100 may have other applications that require the detection of radiation emanating from a source. For example, the system may be used to improve telescopes and other visual imaging devices such as video or still cameras. It may also be used to improve the thermal detection systems (including infra-red cameras and other devices) used by police officers and the like.

Figure 1:
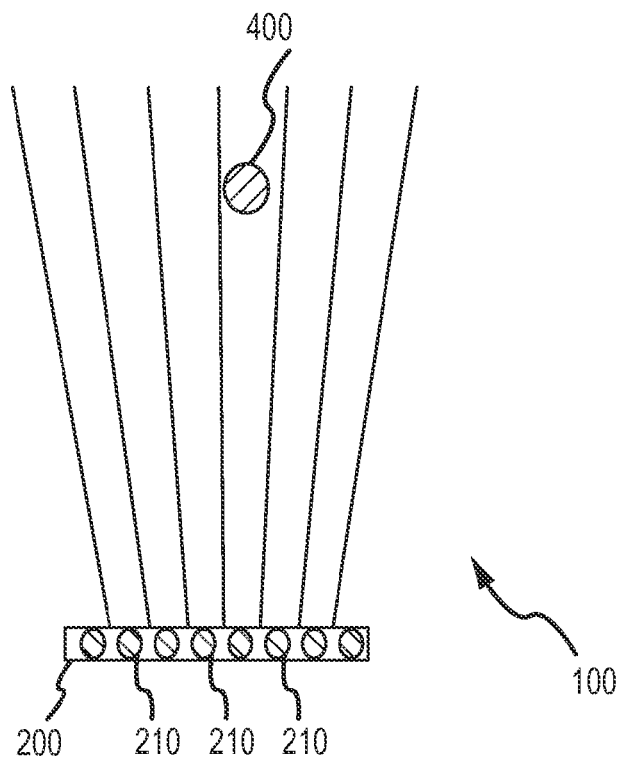
FIG. 1 representatively illustrates a one-dimensional sensor array at time $t_0$.
Figure 2:
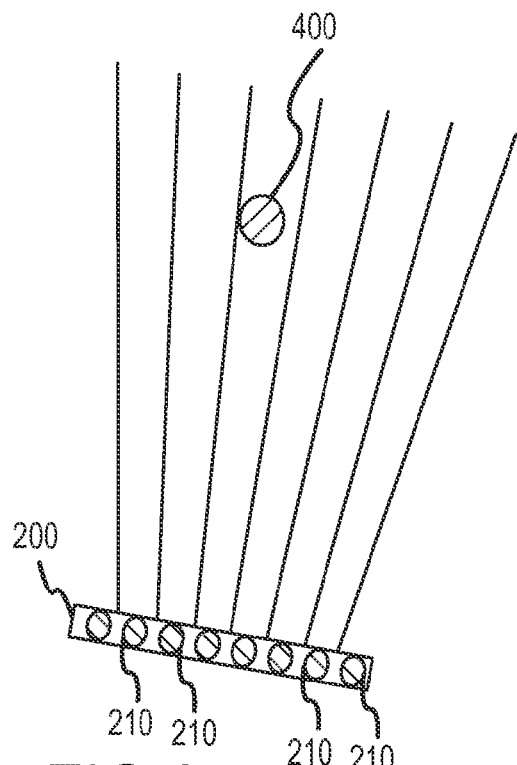
FIG. 2 representatively illustrates a one-dimensional sensor array at time $t_1$.

Referring to FIGS. 1 and 2, the improved detection system 100 comprises a sensor array 200 that generally comprises a plurality of sensor pixels 210. In the present embodiment, the sensor array 200 is capable of detecting at least one of various types of radiation that may emanate from a potential target 400. In some applications, the radiation includes heat, radar (generated by the target itself or reflected off the target from another source), visible light, and other types of electromagnetic radiation. Although electromagnetic radiation often forms the basis for missile targeting systems, it should be noted that the improved detection system 100 may utilize sensor arrays 200 comprising sensor pixels 210 that are sensitive to other types of radiation. For example, sensor pixels that detect sound or chemical radiation may be integrated into the system.

The sensor array 200 has an approximately known field of vision that defines a volume of space that may be observed by the sensor array 200 at any particular time. Furthermore, each of the sensor pixels 210 comprising the sensor array 200 has a field of vision that is smaller than that of the entire sensor array 200. For example, for a sensor 200 having N pixels, the field of vision for each sensor pixel may be equal to $$\frac{FOV_{sensor\_array}}{N}.$$

Furthermore, the sensor pixels 210 may be constructed such that their respective fields of vision do not overlap with the fields of vision of other sensor pixels 210. Accordingly, the field of vision of the sensor array 200 is divided into many segments corresponding to each sensor pixel 210. Although these characteristics may be achieved via construction of the sensor array 200 itself, alternative methods that are well known may be used to ensure that the fields of vision of the individual sensor pixels 210 are evenly distributed amongst the field of vision of the sensor array 200. For example, lens systems may be coupled to the sensor array 200 that serve to focus electromagnetic radiation onto a sensor array 200 and ensure that the fields of vision of the sensor pixels 210 do not overlap.

Figure 3:
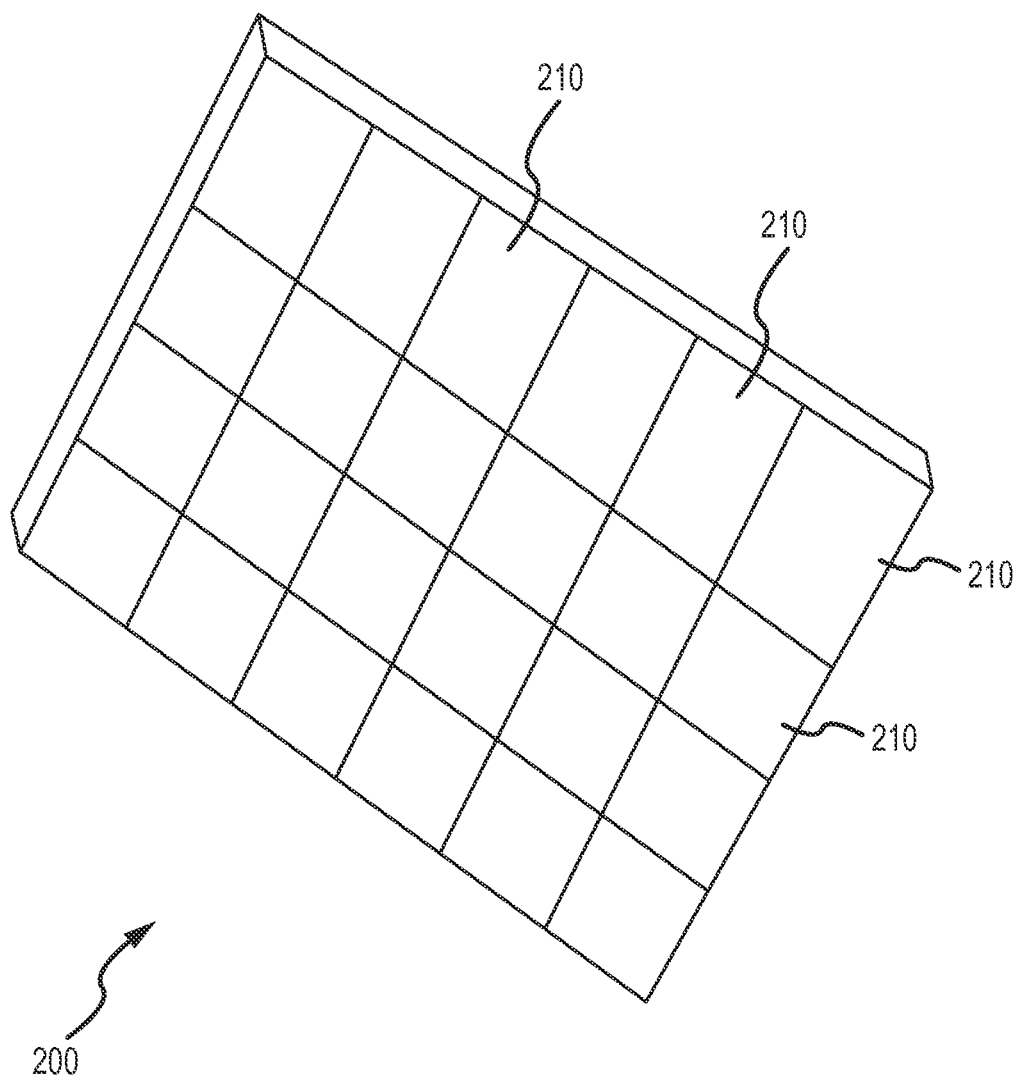
FIG. 3 representatively illustrates a two-dimensional sensor array.

In the present embodiment, the sensor array 200 has a substantially rectangular configuration such that sensor pixels 210 are configured in a series of rows and columns (see FIG. 3). Although such a configuration generally facilitates the process of collecting and analyzing data recorded from the sensor array 200, it is not necessary that the sensor array 200 have a substantially rectangular configuration. As long as the configuration and location of the various sensor pixels 210 is known, data analysis algorithms may be prepared that compensate for any particular geometric configuration of the sensor pixels 210 in the sensor array 200. On missile systems, the sensor array 200 may be arranged in a rectangular configuration such that the rows of sensor pixels 210 lie parallel to the azimuth plane and that the plane defined by the face of the sensor array 200 lies perpendicular to the flight-path of the missile 600.

The sensor array 200 may further comprise any additional components necessary to improve its function. For example, many missile guidance systems comprise optical or electromagnetic components that use one or more lenses to collect radiation that emanates from a target. Any necessary or preferable optical devices may be integrated into the system to modify the functionality of the sensor array 200.

The improved detection system 100 further comprises a translating device. The translating device is suitably configured to scan the field of vision of the sensor array 200 across any particular scene. In the present embodiment, the translation may be achieved by altering the detection system's 100, and, consequently, the sensor array's 200 bearing. In a missile targeting system, the translating device preferably comprises an impulse thruster coupled to the missile that can alter its azimuth bearing. Accordingly, the scanning of the field of vision of the sensor array 200 may be achieved not only via translation of the sensor array 200 but also by a degree of rotation of the sensor array 200. In some applications, rotation of the sensor array 200 may be a suitable method for scanning the field of vision of the sensor array 200 across a scene. For example, in applications wherein the ratio of the diameter of the scene being scanned is substantially larger than the diameter of the sensor array 200, translation may only be achieved by rotation of the sensor array 200. In the present embodiment, wherein the diameter of the sensor array 200 that is part of a missile system is much smaller than the scene being scanned, some rotation of the sensor array 200 may be necessary.

In other systems, however, any device or mechanism capable of altering the detection system's 100 bearing may be utilized. For example, in missile systems, the field of vision of the sensor array 200 may be scanned across a scene by altering the flight of the missile through modification of the configuration of its control surfaces. On other systems, translation may be achieved by mechanisms driven by, for example, electric motors and servomechanisms. Finally, in some applications, translation may be provided by movement of the improved detection system 100 or components of the same. In a further alternative embodiment, for example in a missile system, the missile flight may be sufficiently unstable that during flight of the missile the sensor array 200 sustains sufficient translation. In such a case, the improved detection system 100 may not include a translating device. Furthermore, such translation may be achieved even in the absence of any movement of the sensor array 200. For example, the translating device may comprise a moveable lens system that serves to direct electromagnetic radiation to differing portions of the sensor array 200—thereby effectively scanning the field of vision of the sensor array 200 across a particular scene without any actual translation of the sensor array 200.

In a preferred embodiment, the translating device is capable of scanning the field of vision of the sensor array 200 across a scene at an approximately constant and approximately known rate $\omega$. Generally, $\omega$, the scan rate, is defined as $$\frac{IFOV}{frame}$$

where IFOV is the Instantaneous Field of Vision. The IFOV describes the field of vision (FOV) of a single sensor pixel 210 of the sensor array 200 and frame describes the time required for the sensor array 200 to record information from each of the sensor pixels 210 of the sensor array 200. Accordingly, $\omega$ generally describes the speed at which the field of vision of detection system 100 is scanned across the scene. Although it is preferable that scanning of sensor array 200 take place at a constant rate $\omega$, substantial benefit may be derived from a system where sensor array 200 is not scanned at a constant rate. In fact, a system may be developed wherein the scan rate is essentially random. As long as the scan rate is approximately known, whether the rate changes or is fixed, it would be possible to prepare an algorithm to compensate for the varying scan rate of sensor array 200 and derive the benefits of the detection system 100. Furthermore, it is not necessary that the field of vision of the sensor array 200 be scanned along the azimuth plane. In an alternative embodiment, the improved detection system 100 is scanned in some other manner that includes altering the system's azimuth and elevation bearings. If the detection system 100 is scanned at an approximately known rate $\omega$ and with an approximately known bearing, an analysis algorithm may evaluate the captured data and derive the benefits of the improved detection system 100.

The present embodiment of the improved detection system 100 further comprises a filter algorithm that is coupled to and filters data received from the sensor array 200. The filter algorithm is generally configured to remove noise and inaccuracies from data recorded from the sensor array 200. This includes compensating for any cross-scan drift that may occur during scanning of sensor array 200 across a scene. Cross-scan drift can result if a potential target changes position while the sensor array 200 is scanned across a scene. As a result, some of the energy that originates from the potential target may leak from one row of sensor pixels 210 to another while the scan is taking place. Accordingly, a filter algorithm can be effective in reclaiming that lost energy to create a more accurate depiction of the original scene. In the present embodiment, the filter algorithm comprises a 3×3 filter that operates to localize lost energy on the row being analyzed:

| 0 | ½ | 0 |
|---|---|---|
| 0 | 1 | 0 |
| 0 | ½ | 0 |

Generally, the filter algorithm acts as a mask to combine the value recorded by a sensor pixel 210 with the values of the pixels surrounding that sensor pixel 210 to determine a more accurate value for that sensor pixel 210. With reference to the filter algorithm matrix depicted above, for any particular sensor pixel 210, the filter algorithm first requires that the filter matrix be centered on that pixel. Then the values of each cell of the filter matrix are multiplied by the values recorded by the corresponding sensor pixels 210 and the resulting values are added together. For example, for each pixel in the sensor array 200, the filter algorithm will first multiply that pixel's value by 1, then multiply the values of the pixels above and below the instant pixel by ½, and then combine the values (the other surrounding pixels are multiplied by 0 and so will not alter the value calculated by the sensor algorithm). At the outer boundaries of the sensor array 200, there are insufficient sensor pixels 210 to complete the filter algorithm. In that case, any suitable method of dealing with the lack of pixels can be employed. In the present embodiment, the missing pixels are assigned a value of zero. Other systems may employ more complicated filter algorithms wherein the missing pixels are assigned a value that is derived mathematically from the data recorded from any other sensor pixel 210. The filter algorithm so described may be further tailored for particular applications. For example, in some applications, no filter algorithm will be necessary. Alternatively, more complex filter algorithms may be developed that require analysis of many more sensor pixels 210 in determining the value of a single pixel 210. For example, a filter algorithm may employ well known statistical methods to alter the data recorded from the sensor array 200. Such statistical methods may include any well known mathematical method for analyzing and filtering data. For example, well known optical or statistical analysis algorithms may be used to modify or refine the data recorded by the sensor array 200.

The improved detection system 100 also comprises a missile guidance system. The missile guidance system is generally a computing device such as a computer having a processor and memory that is coupled to the sensor array 200 and the missile. The missile guidance system receives data from the sensor array 200 and associated sensor pixels 210 and/or filter algorithm and analyzes that data to determine whether a target has been detected. If necessary, the missile guidance system can then alter the trajectory of the missile. Many factors may influence the way that the missile guidance system controls the flight of the missile. For example, in addition to data generated by the sensor array 200, the missile guidance system may alter the trajectory of the missile based upon additional information such as pre-determined flight plans, weather information, or other control signals.

Figure 4:
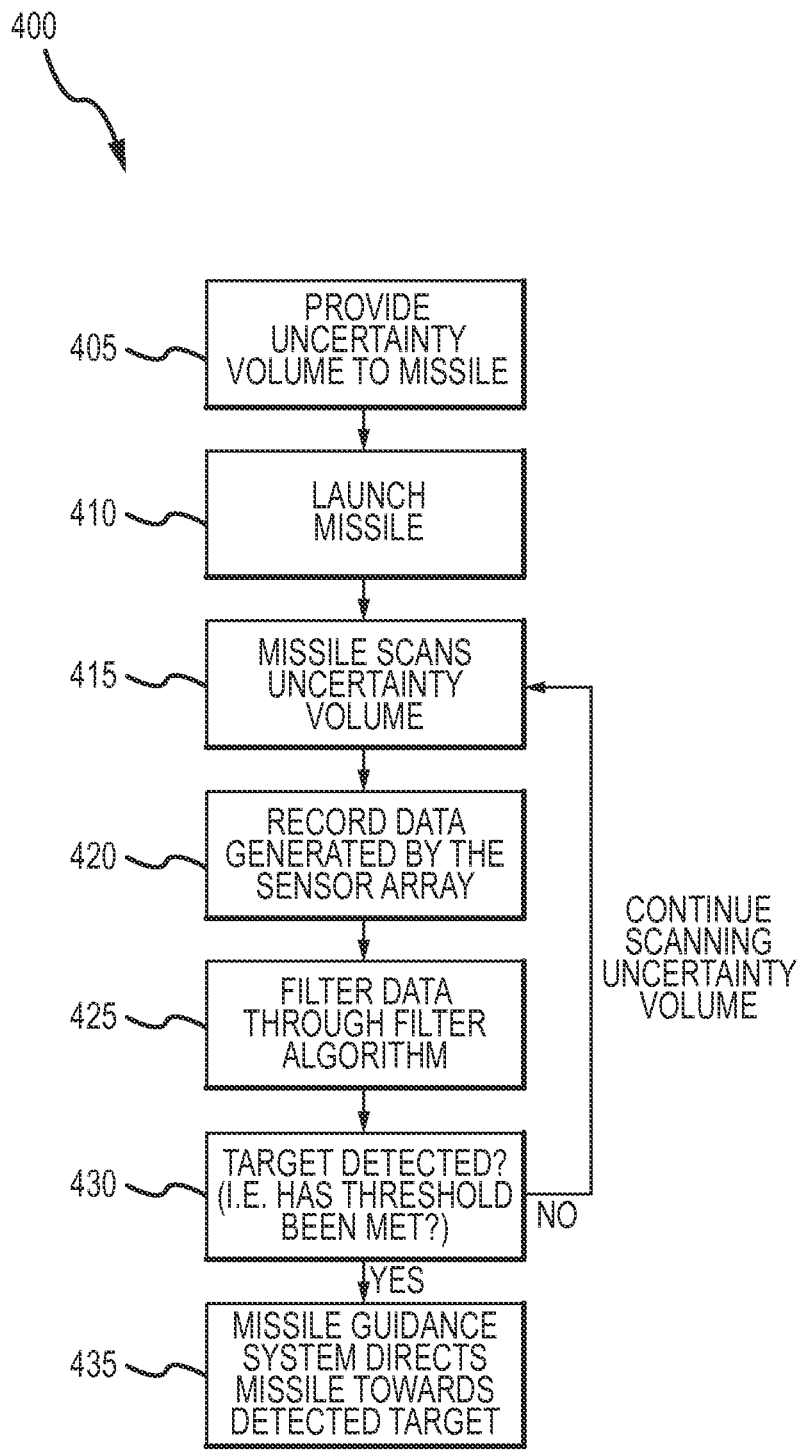
FIG. 4 representatively illustrates a method for targeting a missile system.

A method for the improved detection system 100 is depicted in FIG. 4. Initially, an uncertainty volume 300 is transmitted (405) to the missile system. The uncertainty volume 300 describes a volume of space in which a target may be present and it is used by the missile as its initial search space. In the present embodiment, the uncertainty volume 300 is provided by a separate detection system such as a ground-based station or a system mounted on another vehicle. In alternative embodiments, however, the missile itself may define the initial uncertainty volume 300. The improved detection system 100 may even have applications where no uncertainty volume 300 is defined.

After the missile receives an adequate description of the uncertainty volume 300 it is launched (410). In some applications, the missile launches before it receives all data relating to the uncertainty volume 300 which is later communicated to the missile wirelessly or by some other means.

After launch, the missile begins to scan (415) the uncertainty volume 300 for possible targets 400. While scanning the uncertainty volume (415), the missile guidance system also records data (420) generated by the sensor array 200 and filters that data (425) through the filter algorithm. Upon detecting a possible target (430), the missile guidance system directs the missile to the target (435). Generally, target detection requires two separate processes. First, the missile must scan the field of vision of the sensor array 200 across the uncertainty volume 300. Second, the missile guidance system analyses the data recorded from the sensor array 200 during the scanning process to determine whether a target has been detected. The scanning process and the data analysis process may take place at substantially the same time.

Figure 5:
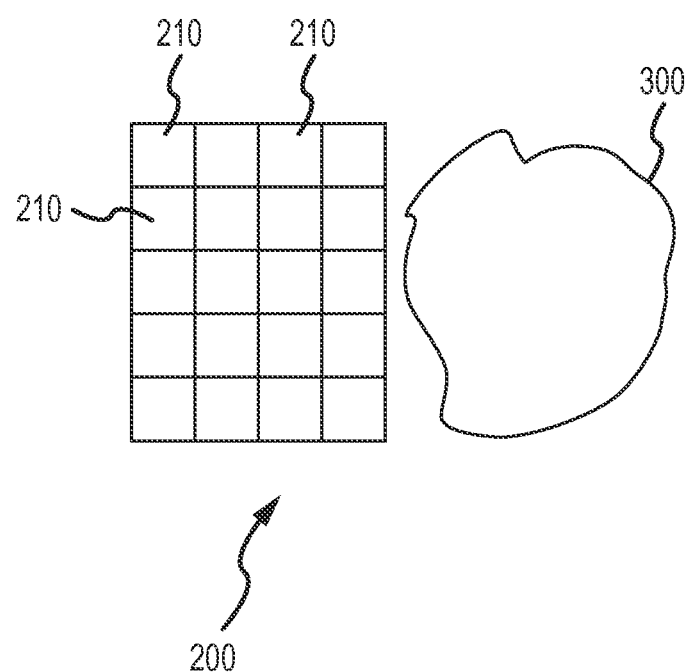
FIG. 5 representatively illustrates a two-dimensional sensor array at time $t_0$ wherein the uncertainty volume is of comparable size to the field of vision of the sensor array.
Figure 6:
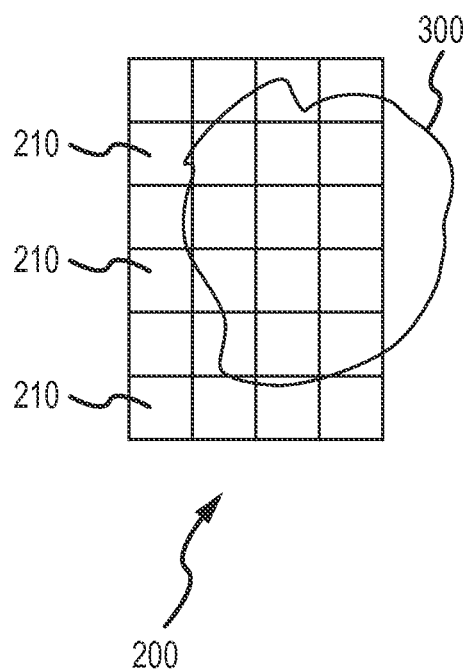
FIG. 6 representatively illustrates a two-dimensional sensor array at time $t_1$ wherein the uncertainty volume is of comparable size to the field of vision of the sensor array.
Figure 7:
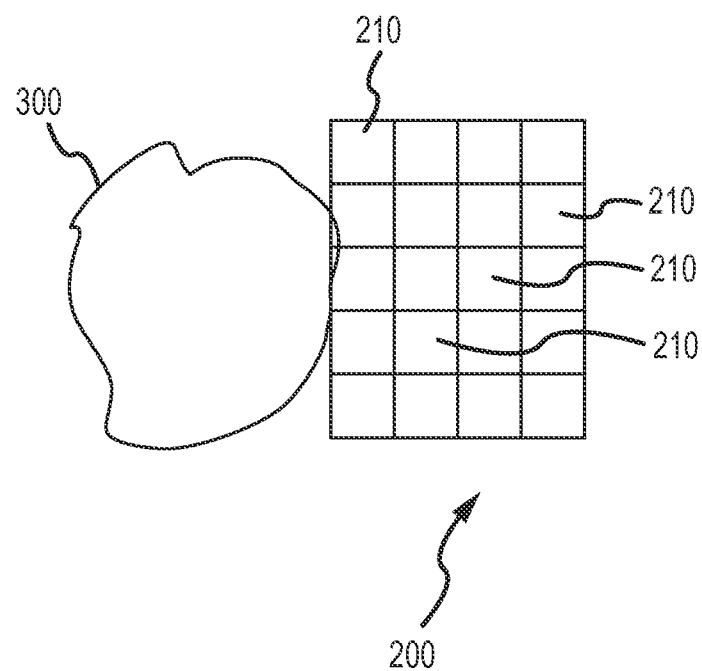
FIG. 7 representatively illustrates a two-dimensional sensor array at time $t_2$ wherein the uncertainty volume is of comparable size to the field of vision of the sensor array.

FIGS. 5, 6, and 7 collectively illustrate an exemplary method of scanning the sensor array 200 across the uncertainty volume 300. FIG. 5 shows the field of vision of the sensor array 200 at a point proximate, but residing entirely outside of the uncertainty volume 300. Accordingly, FIG. 5 illustrates the sensor array 200 and the uncertainty volume 300 at time t=0. From that position, the field of vision of the sensor array 200 is scanned across the uncertainty volume 300 (for example, see FIG. 6 showing the sensory array 200 position at time t=1). The sensor array 200 is scanned across the uncertainty volume 300 until the entire field of vision of the sensor array 200 resides outside the uncertainty volume 300 (see FIG. 7 which illustrates the sensor array 200 position at time t=2). In these exemplary figures, the uncertainty volume 300 is sufficiently narrow that with a single scan the sensor array 200 can acquire data from the entire uncertainty volume 300. However, in some circumstances, the uncertainty volume 300 is relatively large and requires that the sensor array 200 make multiple passes to capture data from all parts of the uncertainty volume 300.

Figure 8:
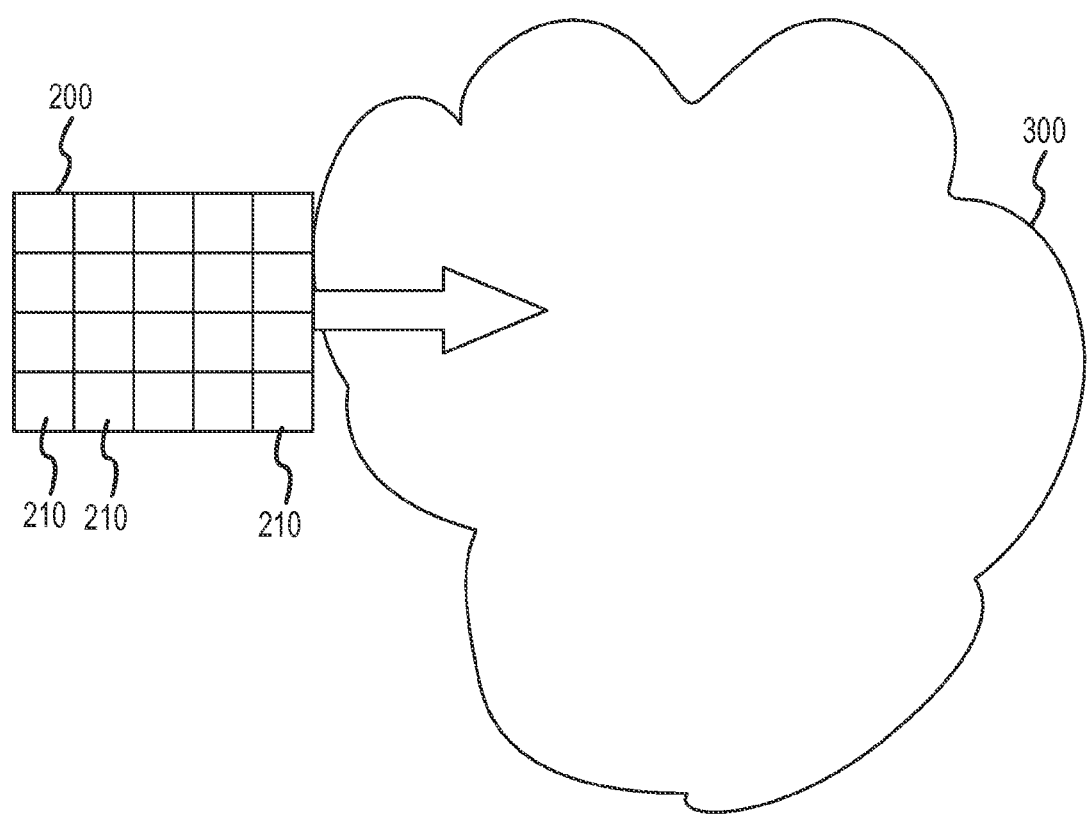
FIG. 8 representatively illustrates a two-dimensional sensor array at time $t_0$ wherein the uncertainty volume is substantially larger than the field of vision of the sensor array.
Figure 9:
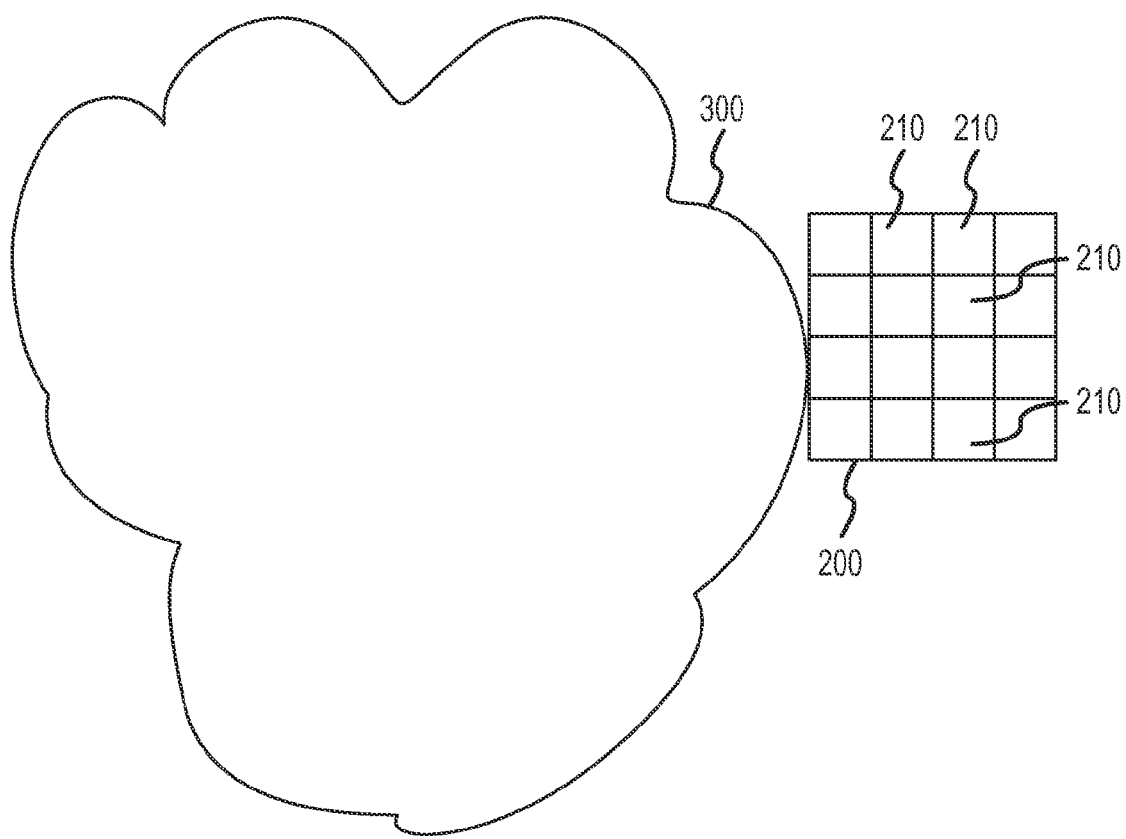
FIG. 9 representatively illustrates a two-dimensional sensor array at time $t_1$ wherein the uncertainty volume is substantially larger than the field of vision of the sensor array.
Figure 10:
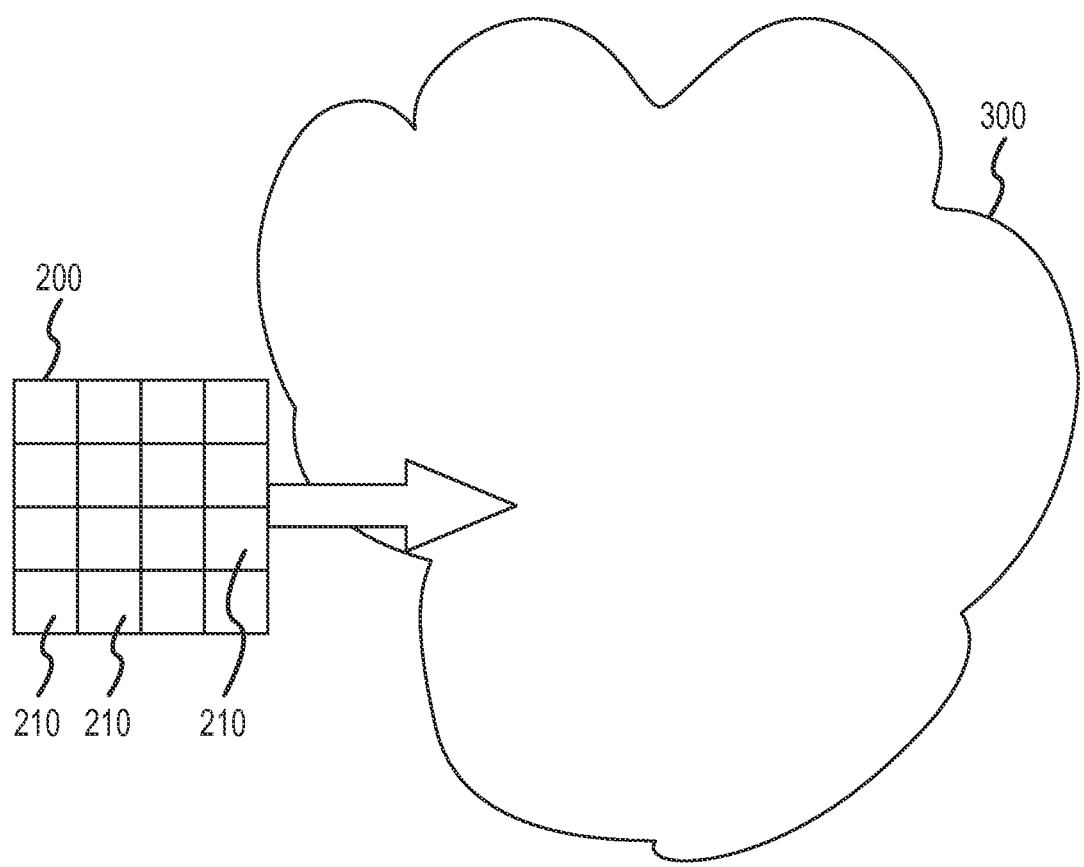
FIG. 10 representatively illustrates a two-dimensional sensor array at time $t_2$ wherein the uncertainty volume is substantially larger than the field of vision of the sensor array.

FIGS. 8, 9, and 10 collectively illustrate a method of scanning the sensor array 200 across an uncertainty volume 300 wherein the uncertainty volume 300 is larger than the field of vision of the sensor array 200. To scan the uncertainty volume 300, the sensor array 200 is first oriented such that the field of vision of the detection system 100 lies just outside the uncertainty volume 300 (see FIG. 8 showing the sensor array 200 position at time t=0). The translating device is then used to scan the field of vision or the sensor array 200 across the uncertainty volume 300 at an approximately known rate $\omega$. FIG. 9 shows the position of the field of vision of the sensor array 200 after completing a single scan of uncertainty volume 300. If the uncertainty volume 300 is large enough and requires multiple passes, the missile guidance system may again orient the field of vision of the sensor array 200 so that it is just outside the uncertainty volume 300 at a location proximate, but not overlapping, the previous pass (see FIG. 10). Another scan of the uncertainty volume 300 can then be made. In alternative embodiments, multiple scans of the field of vision of the sensor array 200 may overlap. Although potentially less efficient, an overlapping scan provides additional data points for the duplicated scan region and may consequently provide more accurate data for that region. Also, if potential targets are moving quickly within the uncertainty volume 300, it may be necessary to perform overlapping scans to ensure that the potential target does not escape detection. For example, overlapping scans may be necessary when a target changes position along a vector perpendicular to the scan direction. The scanning process can be repeated until the entire uncertainty volume 300 has been scanned by the detection system 100. After scanning the entire uncertainty volume, or during scanning activity, the missile guidance system can analyze the data retrieved from the sensor array 200 to determine whether a target is present.

Many different algorithms may be used to scan the sensor array 200 across the uncertainty volume 300. The scan could start at the center of the uncertainty volume 300 and proceed in a spiral that grows until the entire uncertainty volume 300 has been scanned. Alternatively, the detection system 100 may initially scan areas of the uncertainty volume 300 that have been designated as having the highest probability of containing a possible target. Generally, the detection system 100 may scan the uncertainty volume 300 in any manner suitable to the particular application. In some cases, a predetermined scan path will be defined and the detection system 100 will scan the sensor array 200 along that path. After a possible target has been identified, the detection system 100 may limit scanning to the location within the uncertainty volume 300 that contains that possible target. For each of the scan-path algorithms, however, the present embodiment requires that the scan be performed at an approximately known rate $\omega$.

As the sensor array 200 is scanned across the uncertainty volume 300, the fields of vision of different sensor pixels 210 will, at different times, be directed at the same regions of the uncertainty volume 300. Accordingly, the data analysis process requires that the missile guidance system use the approximately known scan rate of $\omega$ to identify data points generated by sensor pixels 210 whose fields of vision were directed towards the same area in the uncertainty volume 300 at the time the data was captured. For example, if the sensor array 200 has dimensions of 128×128 pixels and it was scanned at a rate of $$2\frac{IFOV}{\text{frame}}$$

across an uncertainty volume 300, then radiation emanating from any particular area of the uncertainty volume 300 is detected by every second pixel of the sensor array 200. Accordingly, after filtering the captured data, the missile guidance system can analyze each of the 64 data points originating from the same space within the uncertainty volume 300 that were scanned at different times by different sensor pixels 210 to determine whether a target was discovered. For example, FIG. 1 shows, at time t=0, a 1-dimensional sensor array 200 that is scanned across a scene at a rate of $$1\frac{IFOV}{\text{frame}}.$$

FIG. 2, shows the same sensor array 200 at time t=1. In FIG. 2, a different sensor pixel 210 records data generated by the target 400. If the sensor array 200 is scanned at $$2\frac{IFOV}{\text{frame}},$$

every second sensor pixel 210 records data generated by target 400. In determining whether a possible target exists, the missile guidance system analyzes each frame of data generated by each sensor pixel 210 individually. In the present embodiment, this analysis may take place after the data has been filtered through the filter algorithm. However, in other embodiments the analysis may take place before any data filtering is performed.

In the present embodiment, if any single frame of data recorded from a sensor pixel 210 indicates the presence of a target, then that frame/pixel combination is registered as a 'hit.' This analysis continues for all data recorded from the sensor array 200. During the analysis, the missile guidance system maintains a count of all the hits registered by frame/pixel combinations that describe the same region of the uncertainty volume 300. If the number of hits exceeds a threshold, a target is declared and the missile guidance system can take any suitable action. In the present embodiment, the threshold value is pre-determined and may be affected by many factors such as the quality of the sensor array 200, environmental conditions, and proximity to target. However, in alternative embodiments of the present invention, the threshold value is dynamic and is altered during the flight of the missile. For example, during a first scan of the uncertainty volume 300, the threshold may be relatively high thereby ensuring that the improved detection system 100 is relatively accurate when identifying a target. However, as the missile flight time increases, the threshold may be decreased as proximity to potential targets may mitigate concerns that a false target will be designated.

The data analysis process may be performed at different times and with different methods. The missile guidance system may continuously analyze the data generated by the sensor array 200 in real-time. The new data flowing into the system may be used to continuously update the data that the missile guidance system uses to modify the missile's flight path. Alternatively, the missile guidance system may analyze an entire row of data after the scan of the row has been completed. In an alternative embodiment, the data is analyzed after all data from the uncertainty volume 300 has been collected. In short, a datum recorded from a sensor pixel 210 may be analyzed and used at any time after it has been collected.

As the sensor array 200 is scanned across a scene it achieves a certain number of 'looks' at any particular region in the uncertainty volume 300. The number of looks will be determined by both the number of sensor pixels 210 in the sensor array and the scan rate $\omega$. The number of looks (N) is equal to the largest integer that is less than the value of $$\frac{M}{\omega}$$

where M is the number of sensor pixels 210 lying on a single row of the sensor array 200.

Figure 11:
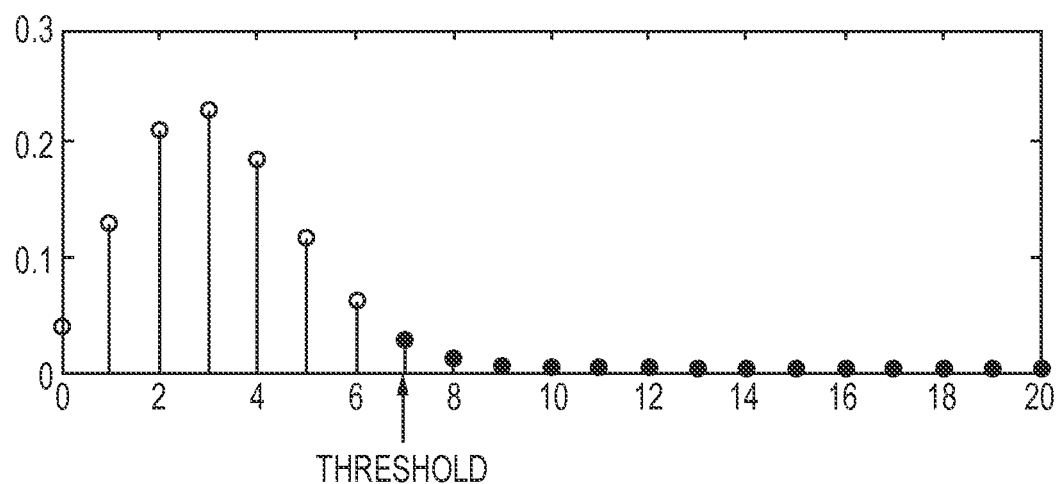
FIG. 11 representatively illustrates a graph of false target acquisition for a single sensor array.

Given a particular number of looks, the probability of a false target acquisition can generally be described by the Bernoulli equation:

$$P_{FAcq} = \sum_{k=Thr}^{N} \binom{N}{k} P_{fa}^{k} \cdot Q_{fa}^{N-k}$$

where Thr is the threshold number of hits that must be achieved before a target is declared, $P_{fa}$ is the probability of false alarm, and $Q_{fa}$ is $(1-P_{fa})$. In this case, because $P_{fa}$ is very small and N is relatively large, the above. Bernoulli trial equation can be summarized as a Poisson density equation:

$$P_{FAcq} \approx \sum_{k=Thr}^{N} \frac{\lambda^{k}}{k!} e^{-\lambda}$$

where $\lambda = N \cdot P_{fa}$. FIG. 11 shows a graph of the probability of false target acquisition for a single sensor array having $P_{fa}$=0.05 [per look], N=64 [looks], and Thr=7[hits]. FIG. 11 shows that for the given threshold, there is less than a 4% probability of the detection system 100 falsely declaring a target. In FIG. 11, the data points indicate the percentage of false target acquisition given a threshold of 7. The circular data points indicate false acquisitions that are not sufficiently numerous to indicate a target. The solid data points indicate false acquisitions that are sufficiently numerous to indicate a target.

Figure 12:
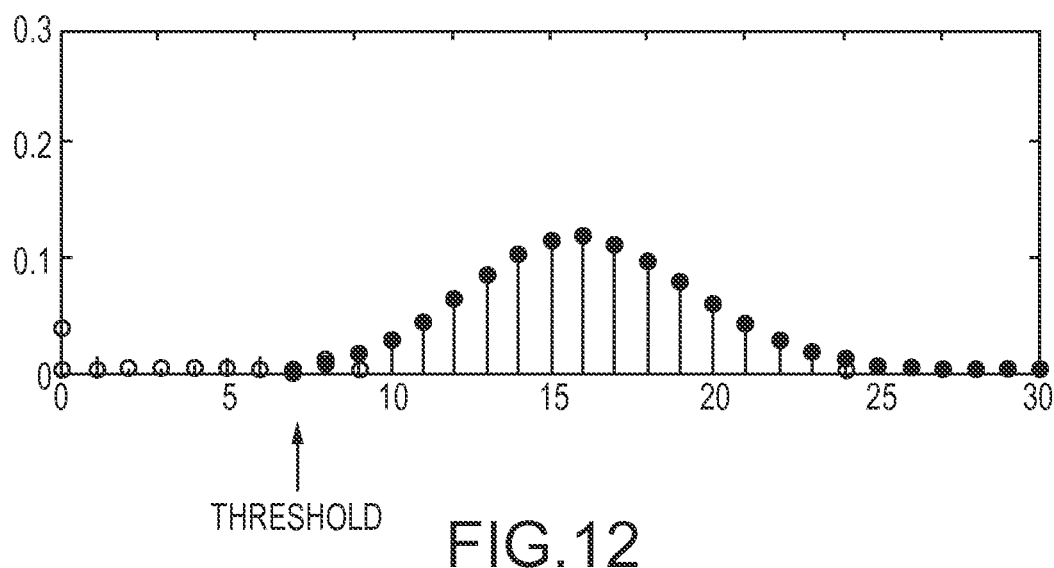
FIG. 12 representatively illustrates a graph of probability of target acquisition for a single sensor array.

The probability of finding a target can be approximated by the following equation:

$$P_{Acq} = \sum_{k=Thr}^{N} \binom{N}{k} P_{det}^{k} \cdot Q_{det}^{N-k}$$

which can be further approximated as $$P_{Acq} = \int_{Thr}^{\infty} \frac{1}{\sqrt{2\pi}\,\sigma} e^{-\frac{(x-\mu)^2}{2\sigma^2}} dx$$

where $\mu = N \cdot P_{det}$ and $\sigma^2 = N \cdot P_{det} \cdot Q_{det}$. FIG. 12 shows a graph of the probability of target acquisition for a single sensor array having $P_{det}$=0.25 [per look], N=64 [looks], and Thr=7 [hits]. FIG. 12 shows that for the given threshold, the probability of acquiring a target is approximately 99.9%. In FIG. 12, the circular data points indicate legitimate targets that are not detected. The solid data points indicate targets that are detected. FIG. 12 shows that 99.9% of targets are detected. In fact, many are detected by a number of sensor pixels 210 far in excess of the necessary threshold.

The system may also be improved by introducing multiple sensor arrays 200 that are part of the detection system 100. In some applications, for example, it may be beneficial to have multiple sensor arrays 200 for detecting visible light and infra-red light. Other applications may require different sensor arrays 200 for detecting different colors of visible light. The additional sensor arrays 200 may alternatively be additional arrays of the same type. Generally, for M sensor arrays 200, the number of looks at any particular area in the uncertainty volume 300 will increase to M×N where N is the number of looks for a single sensor array 200. Generally, an increase in the number of sensor arrays 200 will increase the system's detection rate and accuracy.

For multiple arrays, the equation that describes the detection system's 100 probability of false target acquisition remains:

$$P_{FAcq} \approx \sum_{k=Thr}^{N} \frac{\lambda^k}{k!} e^{-\lambda}$$

However, now, $\lambda = M \cdot N \cdot P_{fa}$ where M is the number of sensor arrays 200. Accordingly, for multiple sensor systems, the probability of a false target acquisition increases slightly over single array systems. However, the increase is minimal and can be compensated by increasing the threshold value for the entire system. With additional sensor arrays 200, the threshold can be increased without negatively impacting the multi-sensor detection system's 100 performance because the multiple sensors also provide a much greater probability of detecting a target.

The probability of target acquisition for a multi-sensor array 200 detection system 100 is equal to:

$$P_{Acq} = \sum_{k=Thr}^{N} \binom{N}{k} P_{det}^k \cdot Q_{det}^{N-k}$$

which can be approximated as $$P_{Acq} = \int_{Thr}^{\infty} \frac{1}{\sqrt{2\pi}\,\sigma} e^{-\frac{(x-\mu)^2}{2\sigma^2}} dx$$

However, now $\mu = N(P_{det,1} + P_{det,2} + P_{det,3} \ldots + P_{det,M})$ and $\sigma^2 = N(P_{det,1} \cdot Q_{det,1} + P_{det,2} \cdot Q_{det,2} + P_{det,3} \cdot Q_{det,3} \ldots + P_{det,M} \cdot Q_{det,M})$.

Figure 13:
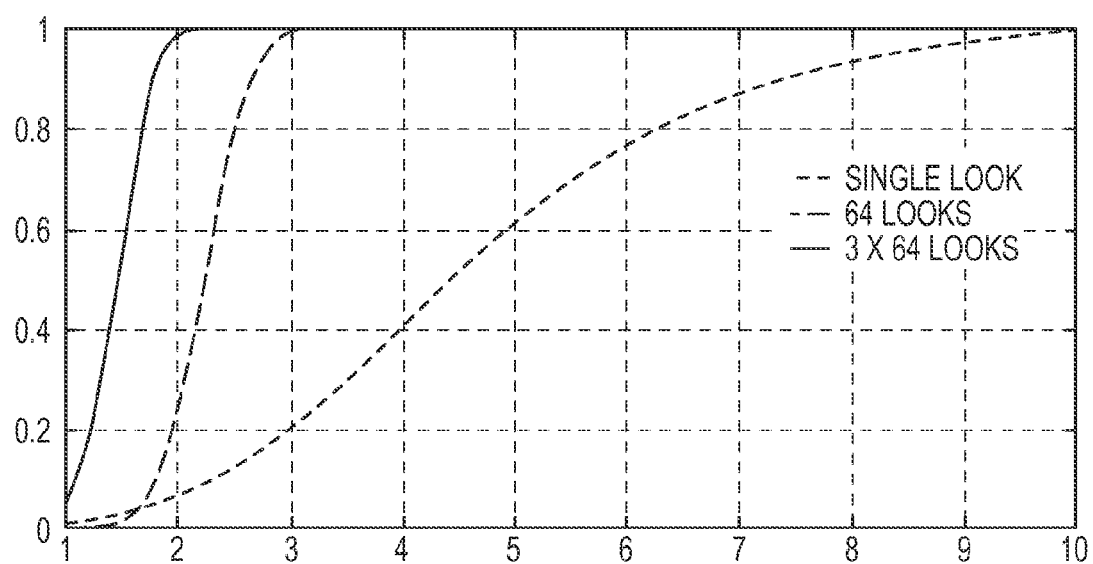
FIG. 13 representatively illustrates a graph of probability of acquisition for a single sensor with a single look and 64 looks, and a 3 sensor array system with each sensor having 64 looks.

Accordingly, the probability of target acquisition for a multi-sensor array 200 detection system 100 increases substantially over single sensor array 200 systems. FIG. 13 shows the improved detection characteristics of the multi-sensor array 200 system. Referring to FIG. 13, the y-axis illustrates the probability that a target will be detected for three different systems: single look sensors, 64-look sensor arrays 200, and 3×64 look multiple sensor arrays 200. The x-axis illustrates the signal-to-noise ratio for a particular potential target.

Generally, the use of multiple sensor arrays 200 increases the probability of acquisition for any particular improved detection system 100 (see FIG. 13). As noted earlier, although the use of multiple sensor arrays 200 tends to also increase the probability of false acquisition, the increase can easily be compensated for by increasing the threshold level for the entire system.

In the foregoing specification, the invention has been described with reference to specific exemplary embodiments; however, it will be appreciated that various modifications and changes may be made without departing from the scope of the present invention as set forth herein. The specification and Figures are to be regarded in an illustrative manner, rather than a restrictive one and all such modifications are intended to be included within the scope of the present invention. Accordingly, the scope of the invention should be determined by the claims and their legal equivalents rather than by merely the examples described above.

For example, the steps recited in any method or process claim may be executed in any order and are not limited to the specific order presented in the claims. Additionally, the components and/or elements recited in any apparatus embodiment may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of the invention.

As used herein, the terms "comprising", "having", "including" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

I claim:

1. A detection device, comprising:
   a sensor array having a plurality of sensor pixels; wherein:
     said sensor array has an approximately known field of vision; and
     each of said plurality of said sensor pixels has an approximately known field of vision;
   a computing device coupled to said sensory array, wherein said computing device is configured to:
   receive a possible target volume associated with a volume of space in which a target may be present;
   record data generated by said sensor array;
   identify a number of the plurality of sensor pixels that indicate a presence of a target in approximately the same portion of a scene within possible target volume based on an approximately known rate of scan of said field of vision; and
   determine whether the target is present within the possible target volume based on whether the number of the plurality of sensor pixels that indicates a presence of the target in approximately the same portion of the scene exceeds a threshold value, wherein the threshold value is dynamic and alterable during flight of a projectile associated with said sensor array; and
   a translating device that is coupled to said sensor array and configured to scan said field of vision of said sensor array across said scene at the approximately known rate;
   a filter coupled to at least one of said sensor and said computing device, wherein said filter is configured to:
   retrieve data generated by at least one sensor pixel of said sensor array;
   retrieve data generated by at least one other sensor pixel of said sensor array; and
   modify said data retrieved from at least one sensor pixel.

2. The device of claim 1, wherein said sensor array comprises an electro-optical sensor array.

3. The device of claim 1, further comprising multiple sensor arrays coupled to said computing device.

4. The device of claim 1, further comprising a projectile, wherein said sensor array is coupled to said projectile.

5. The device of claim 1, wherein said translating device is configured to rotate said sensor array about an axis.

6. The method of claim 1, wherein the threshold value is decreased as the projectile flight time increases.

7. A method of detection, said method comprising the steps of:
- receiving a possible target volume associated with a volume of space in which a target may be present;
- scanning a field of vision of a sensor array across a scene within the possible target volume, wherein said sensor array has an approximately known field of vision and comprises a plurality of sensor pixels, wherein each of said plurality of sensor pixels has an approximately known field of vision;
- retrieving data from said sensor array;
- analyzing said data to identify a number of plurality of sensor pixels that indicate a presence of a target in approximately the same portion of said scene within the possible target volume based on an approximately known rate of scan of said field of vision; and
- determining whether the target is present within the possible target volume based on whether the number of the plurality of sensor pixels that indicates a presence of the target in approximately the same portion of the scene exceeds a threshold value, wherein the threshold value is dynamic and alterable during flight of a projectile associated with said sensor array;
- filtering said data, wherein said step of filtering said data comprises the steps of:
- retrieving data generated by at least one sensor pixel of said sensor array;
- retrieving data generated by at least one other sensor pixel of said sensor array; and
- modifying said data retrieved from at least one sensor pixel.

8. The method of claim 7, wherein said sensor array comprises an electro-optical sensor array.

9. The method of claim 7, wherein said sensor array comprises a plurality of sensor arrays.

10. The method of claim 7, wherein said sensor array is coupled to a projectile.

11. The method of claim 10, wherein said step of scanning said field of vision of said sensor array across a scene is achieved primarily via projectile motion.

12. The method of claim 7, wherein the step of scanning said field of vision of said sensor array is achieved via rotation of said sensor array.

13. A method of detection comprising:
- providing a possible target volume, said possible target volume having an approximately known boundary;
- providing a sensor array that has an approximately known field of vision and comprises a plurality of sensor pixels, wherein each of said plurality of sensor pixels has an approximately known field of vision,
- aligning a boundary of said field of vision of said sensor array with the boundary of said possible target volume;
- scanning said field of vision of said sensor array substantially across said possible target volume at an approximately known scan rate;
- retrieving data generated by said sensor pixels of said sensor array;
- identifying a number of plurality of sensor pixels that indicate a presence of a target in approximately the same portion of said scene within the possible target volume based on an approximately known rate of scan of said field of vision; and
- determining whether the target is present within the possible target volume based on where the number of the plurality of sensor pixels that indicates a presence of the target in approximately the same portion of the scene exceeds a threshold value, wherein the threshold value is dynamic and alterable during flight of a projectile associated with said sensor array;
- filtering said data, wherein said step of filtering said data comprises the steps of:
- retrieving data generated by at least one sensor pixel of said sensor array;
- retrieving data generated by at least one other sensor pixel of said sensor array; and
- modifying said data retrieved from at least one sensor pixel.

14. The method of claim 13, wherein said sensor array comprises a plurality of sensor arrays.

15. The method of claim 13, wherein the step of scanning said field of vision of said sensor array is achieved via rotation of said sensor array.

* * * * *